United States Patent [19]

Calmettes et al.

[11] Patent Number: 5,404,620
[45] Date of Patent: Apr. 11, 1995

[54] CLAMPING SPRING COLLAR WITH IMPROVED SAFETY

[75] Inventors: Lionel Calmettes, Romorantin Lanthenay; Pascal Detable, Gievres, both of France

[73] Assignee: Etablissements CAILLAU, Moulineaux, France

[21] Appl. No.: 201,938

[22] Filed: Feb. 24, 1994

[30] Foreign Application Priority Data

Feb. 26, 1993 [FR] France .................. 93 02261

[51] Int. Cl.⁶ ............................................. F16L 33/02
[52] U.S. Cl. ..................................................... 24/20 R
[58] Field of Search ................. 24/456, 20 R, 20 TT, 24/20 EE, 20 S, 20 CW, 20 W

[56] References Cited

U.S. PATENT DOCUMENTS 3,537,147  11/1970  Pfeuffer .
4,127,921  12/1978  Townsend .

FOREIGN PATENT DOCUMENTS 0443681  8/1991  European Pat. Off. .
0811968  4/1937  France .
3043108  7/1982  Germany .

*Primary Examiner*—James R. Brittain
*Attorney, Agent, or Firm*—Marshall & Melhorn

[57] ABSTRACT

A spring clamping collar constituted by a rolled-up metal strip with the end portions of said strip each being of a width that is substantially equal to half the width of the strip, said portions being disposed beside each other and being provided with tabs that extend radially outwardly from the collar, thereby forming abutments for engaging a pliers-like tool. Each tab extends over substantially the entire width of the strip and possesses, on its side remote from its connection to the corresponding end portion of the strip, an extension which extends over the other end portion of the strip and is directed away from the tab carried by said other end portion.

3 Claims, 1 Drawing Sheet

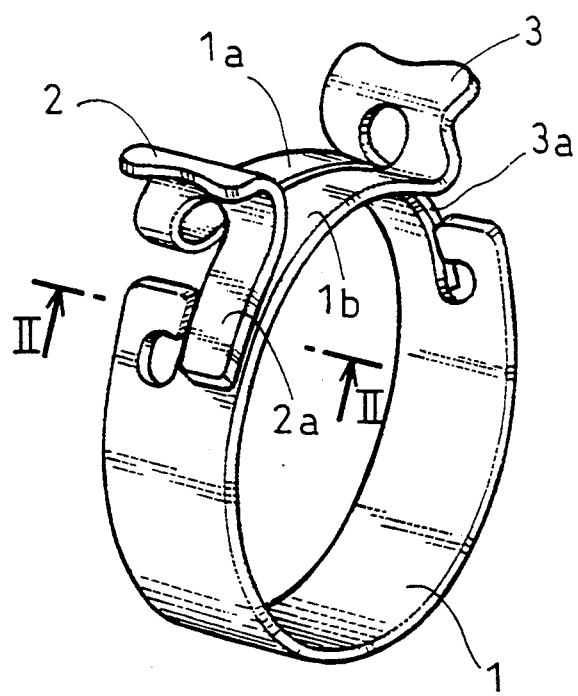
FIG_1
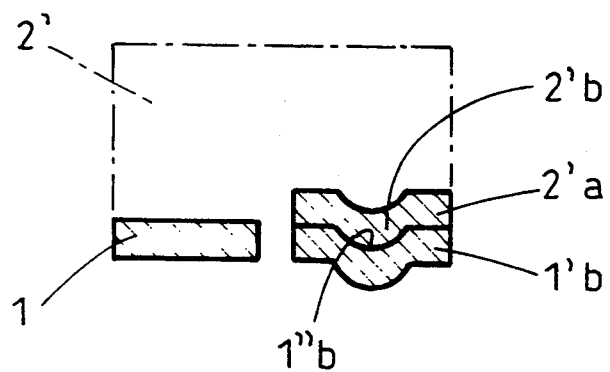
FIG_2

CLAMPING SPRING COLLAR WITH IMPROVED SAFETY

FIELD OF THE INVENTION

Collars for clamping a flexible hose on a rigid pipe, and generally referred to as "spring collars", are already known, in particular from patent EP-A-0 443 681. Such collars are essentially constituted by a rolled-up metal strip, with the end portions of the strip being of a width substantially equal to half the width of the strip, and being disposed side by side. Each end portion is also provided with a tab that is directed radially outwardly from the collar and that constitutes an abutment for the jaws of a pliers-like tool.

BACKGROUND OF THE INVENTION

The metal used is selected or appropriately treated not only so as to have good bending strength, but above all, so as to have rigidity appropriate to its use. Such a collar is installed by moving the above-mentioned abutments towards each other by means of a pliers-like clamping tool. This increases the diameter of the collar, thereby making it easily engaged by axial sliding onto the hose or other object to be clamped. When the force moving the abutments towards each other ceases, the energy stored in the collar is released so that the collar automatically clamps the hose as it tends to return to its initial diameter.

Proposals have already been made, in particular in patent DE-A-3 043 108, to cut out the strip in such a manner that the tabs extend across the entire width of the strip, thereby making it easier to use with "broad-nose" or "general-purpose" pliers. However, in many cases, it is preferable to use a clamping tool referred to as "long-nose pliers" given the accuracy with which such pliers engage the abutments of a collar. However, spring collars of the type mentioned above are unsuitable for being put into place by means of long-nose pliers.

OBJECTS AND SUMMARY OF THE INVENTION

An object of the present invention is therefore to provide a clamping spring collar in which its pliers-engaging tabs are suitable for being engaged by a long-nose pair of pliers, with this being true in a manner that is entirely reliable, i.e. that makes clumsy mistakes most unlikely while a collar is being put into place on an object to be clamped.

According to the invention, each tab extends over substantially the entire width of the strip and possesses, on its side remote from its connection to the corresponding end portion of the strip, an extension which extends over the other end portion of the strip and is directed away from the tab carried by said other end portion.

BRIEF DESCRIPTION OF THE DRAWING

The invention will be better understood and its characteristics and advantages will appear more clearly on reading the following description given with reference to the accompanying drawing, in which:

FIG. 1 is a perspective view of a collar of the invention; and

FIG. 2 is a section on II—II of FIG. 1, for a variant embodiment that is visible in the righthand half of the figure.

MORE DETAILED DESCRIPTION

With reference initially to FIG. 1, there can be seen a spring collar constituted by a rolled-up metal strip 1. The width of each of its end portions 1a and 1b is substantially equal to half the width of the strip, and each end portion is provided with a respective tab 2 or 3 that projects radially outwards from the collar. In conventional manner, the tabs 2 and 3 constitute thrust abutments for engaging a pliers-like tool that makes it possible, by moving said tabs towards each other, to increase the diameter of the collar so as to enable it to be threaded axially onto an elongate object, in particular a flexible hose fitted onto a rigid pipe. When the force on the tabs 2 and 3 is released, the collar is clamped by means of the energy stored in the spring constituted by the strip 1 itself.

The tab 2 associated with end portion 1a extends over substantially the entire width of the strip 1 and possesses an extension 2a which extends over the end portion 1b and possibly also the strip 1 in a direction that goes away from the tab 3.

Naturally, the tab 3 is itself organized in a disposition that is symmetrical to that described above.

As explained below, these dispositions make it easier for the tabs to be engaged by a tool of the long-nose pliers type.

Further, as can be seen clearly in FIG. 1, each tab 2 and 3 is advantageously in the form of half a cylinder with the convex sides of the two tabs facing each other. Because of this complementary disposition, the tabs form a kind of housing for the tips of a tool, thereby contributing to reliable engagement of the tabs on the tool.

Reference is now made to FIG. 2, and more particularly to the righthand portion of said figure in which it can be seen that in an advantageous variant embodiment, the extension 2'a of tab 2' as shown diagrammatically and analogous in structure to tab 2 as described above has a stamping that constitutes a projection 2'b projecting towards the inside of the collar. The end portion 1'b itself has a groove 1"b extending over an appropriate length and also projecting towards the inside of the collar, which groove may also extend somewhat into the ordinary portion of the strip 1.

Naturally, the tab 3 is provided with an extension 3a in a disposition that is symmetrical to that described above for the end portion 1b of the strip 1.

A spring collar of the invention can thus be installed in conventional manner using a pair of long-nose pliers where the long and narrow jaw members are reliably engaged in respective ones of the housings formed by the tabs. But above all, it is the extensions of the tabs 2 and 3 that ensure there is no danger of the jaws slipping underneath the tabs and running the risk, should the tool be engaged in a manner that is not exactly right, of the tabs being poorly grasped when they are moved together by the tool, or even of the tabs being abnormally deformed, or of their connection zones with the end portions 1a and 1b that carry them being abnormally deformed.

Furthermore, in the variant shown in FIG. 2, the extensions of the tabs are guided by the stamped projections co-operating with the corresponding grooves, thereby preventing any abnormal deformation of the collar while it is being put into place, and thus contributing to ensuring that clamping takes place under design conditions.

It should be emphasized that the dispositions of the collar as described above are advantageously used on collars that constitute the subject mater of the Applicants' copending patent application filed on the same day and entitled "A clamping spring collar".

We claim:

1. A spring clamping collar constituted by a rolled-up metal strip with the end portions of said strip each being of a width that is substantially equal to half the width of the strip, said portions being disposed beside each other and being provided with tabs that extend radially outwardly from the collar, thereby forming abutments for engaging a pliers-like tool, wherein each tab extends over substantially the entire width of the strip and possesses, on its side remote from its connection to the corresponding end portion of the strip, an extension which extends over the other end portion of the strip and is directed away from the tab carried by said other end portion.

2. A clamping collar according to claim 1, wherein each tab is substantially semicylindrical in shape, with the convex side of each tab facing the other tab.

3. A clamping collar according to claim 1, wherein the outside surface of the strip, at least in the vicinity of each of its end portions, presents a groove extending in the peripheral direction and constituting a guide member for a projection directed towards the inside of the collar and situated on the corresponding extension of one of the tabs.

* * * * *